United States Patent
Galvin et al.

(10) Patent No.: US 8,688,783 B2
(45) Date of Patent: Apr. 1, 2014

(54) SELECTION OF REAL TIME COLLABORATION TOOLS

(75) Inventors: James P. Galvin, Georgetown, KY (US); Amy D. Travis, Arlington, MA (US); Sara Weber, Arlington, MA (US)

(73) Assignee: International Business Machines Corporation, Armonk, NY (US)

(*) Notice: Subject to any disclaimer, the term of this patent is extended or adjusted under 35 U.S.C. 154(b) by 1449 days.

(21) Appl. No.: 11/946,815

(22) Filed: Nov. 28, 2007

(65) Prior Publication Data

US 2009/0138553 A1     May 28, 2009

(51) Int. Cl.
   *G06F 15/16*     (2006.01)
   *H04N 5/232*     (2006.01)

(52) U.S. Cl.
   USPC .................................. 709/205; 348/211.12

(58) Field of Classification Search
   USPC ................................................. 709/204, 205
   See application file for complete search history.

(56) References Cited

U.S. PATENT DOCUMENTS

| | | |
|---|---|---|
| 7,103,806 B1 | 9/2006 | Horvitz |
| 7,152,220 B2 | 12/2006 | Rickards, III et al. |
| 2002/0010736 A1 | 1/2002 | Marques et al. |
| 2002/0026398 A1 | 2/2002 | Sheth |
| 2004/0174392 A1* | 9/2004 | Bjoernsen et al. ............ 345/751 |
| 2005/0034079 A1* | 2/2005 | Gunasekar et al. ........... 715/753 |
| 2005/0198085 A1 | 9/2005 | Blakey et al. |
| 2005/0204297 A1 | 9/2005 | Banatwala et al. |
| 2006/0059431 A1 | 3/2006 | Pahud |
| 2006/0075091 A1 | 4/2006 | Beyda et al. |
| 2006/0095366 A1 | 5/2006 | Sheth et al. |
| 2006/0117042 A1 | 6/2006 | Hu et al. |
| 2006/0168582 A1 | 7/2006 | Muller et al. |
| 2007/0083417 A1 | 4/2007 | Wagner et al. |

OTHER PUBLICATIONS

"A Roadmap to the Microsoft-Groove Networks Strategic Relationship", Groove Networks (Jun. 2002).
eCollaborate, Entellium Technologies Sdn. Bhd. (2002).
"Selecting a Tool", National Instruments, <http://zone.ni.com/reference/en-XX/help/371361B-01/lvhowto/selecting_a_tool/> (last visited Oct. 17, 2007).
O'Shea et al., "Method for Automatic Tool Selection for Disassembly Planning", Assembly Automation, vol. 19, issue 1, pp. 47-54 (1999). Abstract only.
Rui et al., "Automatic Matching Tool Selection Using Relevance Feedback in Mars", Int. Conf. on Visual Information Retrieval (1999).

(Continued)

*Primary Examiner* — Moustafa M Meky
*Assistant Examiner* — Blake Rubin
(74) *Attorney, Agent, or Firm* — Cuenot, Forsythe & Kim, LLC (57) ABSTRACT

A computer-implemented method of selecting a real time collaboration application can include associating each of a plurality of real time collaboration applications with a plurality of performance statistics, receiving a request for a real time collaboration session from a personal productivity application, and identifying a data type to be shared through one of the plurality of real time collaboration applications. One of the plurality of real time collaboration applications can be selected according to the data type to be shared and the plurality of performance statistics. The selected real time collaboration application can be output.

19 Claims, 4 Drawing Sheets

(56) References Cited

OTHER PUBLICATIONS

"Tools for Taxonomies, Browsable Directories, and Classifying Documents into Categories", <http://www.searchtools.com/info/classifiers-tools.html> (last visited Oct. 17, 2007).

Matthews, "A Model for Integrated Spatial and Structural Design of Buildings", <http://www.artifice.com/matthews/papers/CAADRIA98-Matthews_Paper.html>, (1998) (last visited Oct. 17, 2007).

* cited by examiner

SELECTION OF REAL TIME COLLABORATION TOOLS

FIELD OF THE INVENTION

The embodiments of the present invention relate to real time collaboration applications and, more particularly, to evaluating such applications for sharing content during a real time collaboration session.

BACKGROUND OF THE INVENTION

Personal productivity applications typically refer to a class of application program that is used by a single user. In general, users may work with a personal productivity application to create and/or edit an electronic document or generate some other type of work product or output. Examples of personal productivity applications can include word processors, spreadsheet programs, presentation or slide show generation programs, and the like.

By comparison, a real time collaboration (RTC) application allows two or more users to establish and participant within a collaborative session in real time. Within an RTC session, the participants may communicate with one another, share data, e.g., files, or the like. Examples of RTC applications can include presence, instant messaging, application sharing, and slide sharing, e.g., IBM® Lotus® Sametime®. IBM Lotus Sametime is available from International Business Machines Corporation of Armonk, N.Y. IBM, Lotus, and Sametime are trademarks of International Business Machines Corporation in the United States, other countries, or both.

If a user wishes to collaborate with another user in real time to continue working with material generated from a personal productivity application or otherwise share that material, the user must initiate an RTC session. Typically, the user invokes the RTC application and either imports the material to be shared into the RTC application or shares the personal productivity application within which the material was created or edited. The RTC application makes the material available to remote participants in the RTC session. In this scenario, the user must discontinue one context, e.g., utilization of the personal productivity application, and enter another, e.g., select and execute an RTC application.

Attempts have been made to incorporate the ability to initiate an RTC session within personal productivity applications. Available techniques for accomplishing this, however, require that developers of the personal productivity application, or any extensions, have an understanding of the underlying implementation details and capabilities of the particular RTC application that is being "tied" into the personal productivity application.

BRIEF SUMMARY OF THE INVENTION

The embodiments disclosed herein relate to real time collaboration applications and, more particularly, to evaluating such applications for use in conjunction with a personal productivity application. One embodiment of the present invention can include a computer-implemented method of selecting a real time collaboration application. The method can include associating each of a plurality of real time collaboration applications with a plurality of performance statistics, receiving a request for a real time collaboration session from a personal productivity application, and identifying a data type to be shared through one of the plurality of real time collaboration applications. One of the plurality of real time collaboration applications can be selected according to the data type to be shared and the plurality of performance statistics. The selected real time collaboration application can be output.

Another embodiment of the present invention can include a computer-implemented method of selecting a real time collaboration application including presenting a list including a plurality of different data types, associating each data type with a selection technique to be used in selecting one of a plurality of real time collaboration applications, and receiving a request for a real time collaboration session. The request can specify a data type to be shared. A real time collaboration application can be selected according to the selection technique associated with the data type specified by the request. Execution of the selected real time collaboration application can be initiated.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk—read only memory (CD-ROM), a compact disk—read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to evaluating real time collaboration (RTC) applications for usage in conjunction with a personal productivity application. Performance statistics relating to a plurality of different RTC applications can be collected and/or maintained. A request for an RTC session can be received that specifies the type of data to be shared during the RTC session to be established. Available RTC applications can be evaluated using the performance statistics in view of the data to be shared. An RTC application can be selected for use in establishing and/or conducting the RTC session.

In accordance with the inventive arrangements, a framework that enforces the separation between personal productivity applications and RTC applications can be provided. The framework can provide a single application programming interface (API) that allows a personal productivity application to request an RTC service or application. The framework also can define the APIs used by the RTC applications that may be requested. This allows developers of personal productivity applications to deal with a single API, e.g., the API of the framework presented to the personal productivity application, rather than having to learn the API of each RTC application that may be used or accessed by a personal productivity application. In consequence, RTC applications may be more easily incorporated and integrated into personal productivity applications.

Figure 1:
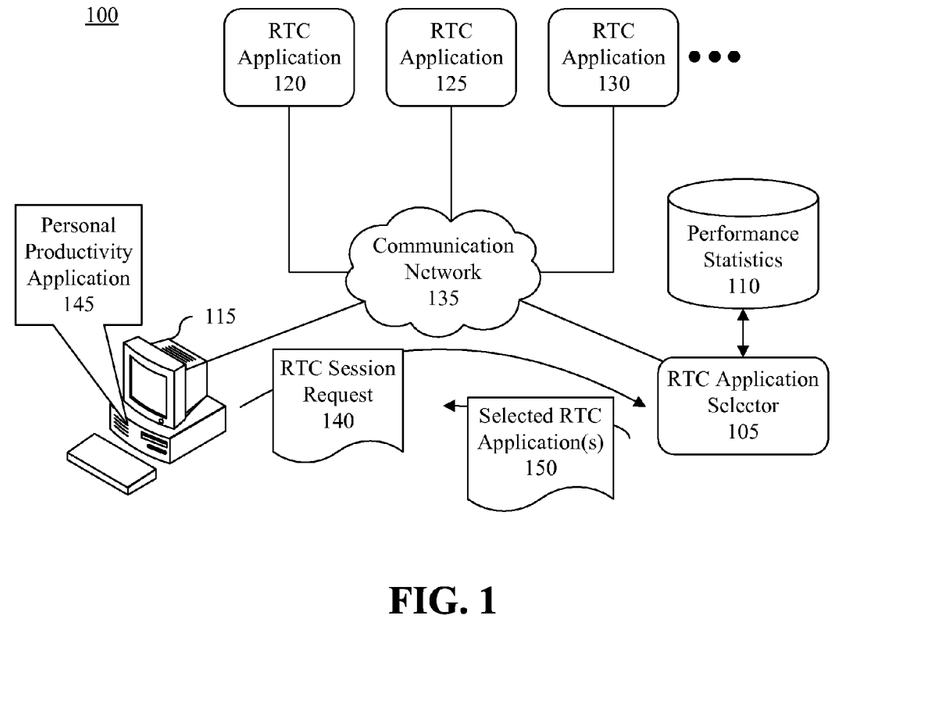
FIG. 1 is a block diagram illustrating a system for selecting a real time collaboration (RTC) application for conducting an RTC session in accordance with one embodiment of the present invention.

FIG. 1 is a block diagram illustrating a system 100 for selecting an RTC application for conducting an RTC session in accordance with one embodiment of the present invention. As shown, the system 100 can include an RTC application selector 105, performance statistics 110, a requesting data processing system 115, and a plurality of RTC applications 120, 125, and 130, each being communicatively linked via a communication network 135. The communication network 135 may be implemented as, or include, the Internet, an intranet, a WAN, a LAN, another type of network, whether wired or wireless, or any combination thereof.

The RTC application selector 105 can be implemented as a computer program, e.g., a service or Web service or application, executing within a data processing system. For example, the RTC application selector 105 may execute on a conventional computer system, a server, one or more other types of data processing systems, or any combination thereof. The performance statistics 110 may be stored within the same data processing system within which the RTC application selector 105 executes, within a separate, network accessible data store, or the like.

In general, the RTC application selector 105 can evaluate the suitability of various RTC applications, e.g., RTC applications 120-130, for use in establishing and/or conducting an RTC session. An RTC application, such as any of RTC applications 120-130, generally refers to an application that allows some form of digital content to be shared among two or more users or participants in an RTC session. Digital content can refer to, for example, files of various data types such as, text documents, word processing documents, spread sheets, video files, audio files, audiovisual files, slide shows, or the like. In that regard, a data type also may refer to a file type and identify one or more different applications that may be used to access that file type. For example, data types can include, but are not limited to, TIFF or TIF (Tagged Image File Format), HTML (Hypertext Markup Language), or the like which may be indicated by a file extension.

Examples of RTC applications can include applications that allow desktop sharing, playback or viewing of slide shows or other electronic documents, and/or communication with, by, or among multiple users concurrently. Though three RTC applications are depicted in FIG. 1, it should be appreciated that more than three RTC applications may be included and/or used with the embodiments disclosed herein. Other types of RTC applications also are contemplated. Any RTC application for which performance statistics 110 can be collected, input, and/or maintained may be used with the embodiments disclosed herein.

The performance statistics 110 can be collected and maintained for each of the RTC applications included within system 100. The RTC application selector 105, for example, may provide a framework through which the RTC applications can report performance metrics to the RTC application selector 105. The RTC application selector 105 can store the reported performance statistics within the performance statistics 110. Similarly, any requesting data processing systems or other data processing systems of participants in an RTC session may be programmed or configured to communicate performance statistics to the RTC application selector 105 for storage within the performance statistics 110. Such reporting mechanisms may be specified or included in the APIs made available by the RTC application selector 105 to personal productivity applications executing in requesting and/or participant data processing systems and to RTC applications.

The performance statistics 110 can include objective and subjective performance statistics. Objective performance statistics can include, but are not limited to, for each RTC application, one or more measures of computing resource usage, the execution environment with which the RTC application is compatible, e.g., acceptable operating systems of the participant data processing systems, a frame rate at which content may be shared, a measure of latency, or the like. Measures of resource usage may include, for example, the amount of screen real estate consumed by an RTC application, the bandwidth needed by the RTC application, CPU utilization, disk utilization, memory utilization, etc. Frame rate relates to the rendering of data to be shared and the frequency with which the rendering is updated. Latency can refer to how long a participant must wait to see a data update or for a data refresh to occur. Such measures may be observed with respect to participant data processing systems, e.g., requesting data processing system 115, or the particular data processing system that hosts the RTC application that is being used for a given RTC session.

Subjective performance statistics can include user comments and/or responses to questions relating to a user's experience in using a particular RTC application for an RTC session. The subjective performance statistics can include information such as whether the participant felt that the RTC application offered suitable ease of use, speed, and/or the overall capabilities of the RTC application.

In operation, an RTC session request 140 can be sent from the requesting data processing system 115. The requesting data processing system 115 may be implemented as a desktop computer, a portable computer, a mobile computer, or the like. The requesting data processing system 115 can execute a personal productivity application 145, which may be the source of the RTC session request 140. For example, a user working at the requesting data processing system 115 within the personal productivity application 145 may provide a user input that causes the personal productivity application 145 and requesting system 115 to issue the RTC session request 140 to the RTC application selector 105.

The RTC session request 140 can specify the data type to be shared within the RTC session being requested. As noted, the data type may specify information including, but not limited to, the type of content within the file to be shared, the type of file, as well as one or more potential applications that may be used to view or otherwise access the data type. The RTC session request 140 may also include time stamp information specifying a date and/or time of the RTC session request 140, one or more or all of the participants of the RTC session to be established, the participant initiating the RTC session, the size of the data to be shared, the location of one or more or all participants of the RTC session, or the like.

It should be appreciated that the RTC session request 140 further may specify any information needed by the RTC application selector 105 to initiate an RTC session with a selected RTC application. Such information can be enumerated in the API provided by the RTC application selector 105 to the personal productivity application 145.

The RTC application selector 105 may receive the RTC session request 140 via the communication network 135. The RTC application selector 105 can compare the received RTC session request 140 with the performance statistics 110 for the available RTC applications 120-130 and select an RTC application from the available RTC applications 120-130 that is suited for use in the RTC session.

For example, the data type to be shared within the RTC session to be established may require a minimal level of bandwidth or other computing resources in order to share the designated data type in an efficient, glitch-free manner. A suitable RTC application may be selected according to such bandwidth requirements. The number of RTC session participants as well as other information, e.g., the location of each respective RTC session participant, may be used to select an appropriate RTC application. Subjective performance statistics also may be used in selecting a suitable RTC application. As noted, subjective performance statistics can relate to the satisfaction of users with respect to usage of the various RTC applications 120-130 during prior RTC sessions.

The RTC application selector 105 can output a list 150 specifying one or more selected RTC applications to be used for the RTC session. For example, a single selection may be output as the most suitable RTC application to be used based upon the available information. In another example, an ordered list of suitable RTC applications can be provided. In that case, for instance, the list may be sorted according to one or more or any combination of preferred, e.g., user-specified, performance statistics or the most suitable to least as determined by the RTC application selector 105. As used herein, "output" or "outputting" can include, but is not limited to, writing to a file, writing to a user display or other output device, playing audible notifications, sending or transmitting to another system, exporting, or the like.

For example, if a list of a plurality of RTC applications is output, the user of the requesting data processing system 115 can be presented with the list 150 and select a particular RTC application to be used from the list 150 of suitable RTC applications. If one RTC application is specified on the list 150, the user of the requesting data processing system 115 may or may not be presented with the selection made by the RTC application selector 105. In one embodiment, the selected RTC application, or top-rated RTC application, may be invoked or initiated automatically by the RTC application selector 105 to begin the RTC session. An "RTC session," as used herein, can refer to the time period during which two or more users may concurrently communicate with one another and/or concurrently share a designated digital resource, e.g., data type, using an RTC application.

User preferences in terms of the way RTC applications are to be selected may be stored within the RTC application selector 105, within the performance statistics 110, or transmitted as part of the RTC session request 140. Such preferences can be stored on a per user basis and on a per data type basis. For example, the preferences can specify that for a particular user, and for data or file types of HTML, select the most suitable RTC application, allow the user to choose a specific RTC application from a list of available RTC applications, or always select a particular RTC application.

Figure 2:
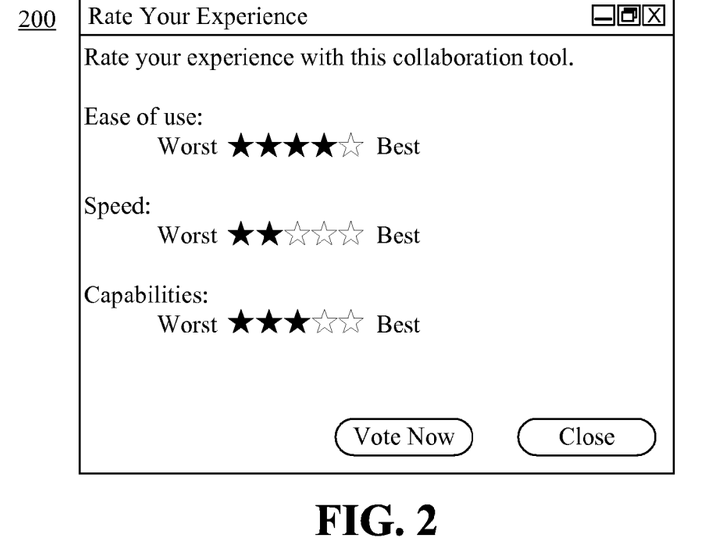
FIG. 2 is a view of a graphical user interface (GUI) for use with the system of FIG. 1 in accordance with another embodiment of the present invention.

FIG. 2 is a view of a graphical user interface (GUI) 200 for use with the system of FIG. 1 in accordance with another embodiment of the present invention. GUI 200 allows a user to provide a subjective rating of his or her experience using a particular RTC application for an RTC session. For example, after a given RTC session, the participants of that RTC session may be presented with GUI 200 and asked to rate the RTC application used. The user-specified comments can be stored as part of the performance statistics of the RTC application being rated. Information provided by the participant(s) can be provided to the RTC application selector and stored within the performance statistics by the RTC application selector to be used in evaluating the suitability of the RTC application for future RTC sessions. It should be appreciated that in another embodiment, another agent may be used for collection and storing of performance statistics from the various RTC applications and/or participant data processing systems.

Figure 3:
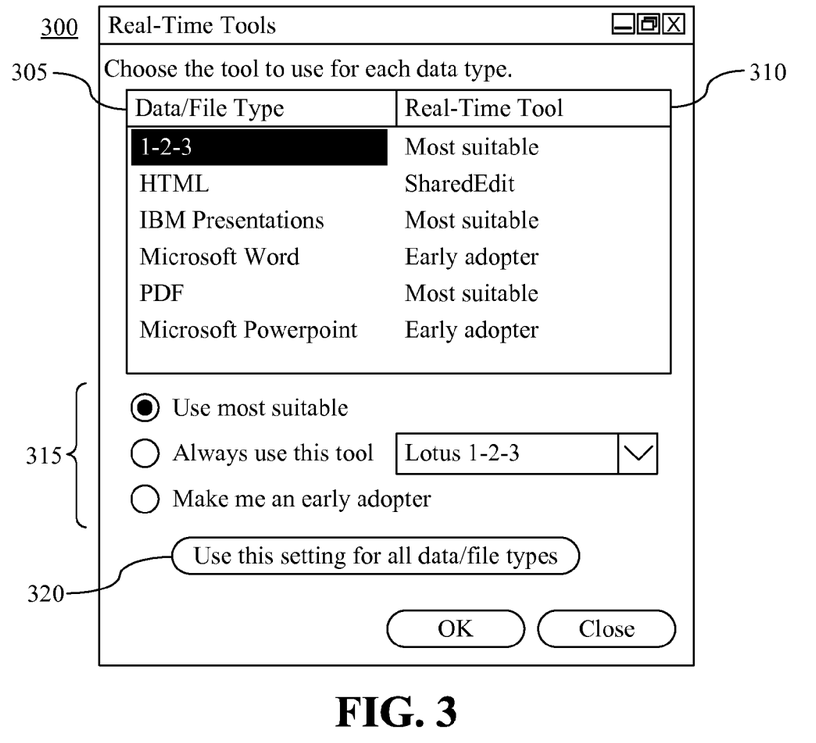
FIG. 3 is a view of a GUI for use with the system of FIG. 1 in accordance with another embodiment of the present invention.

FIG. 3 is a view of a GUI 300 for use with the system of FIG. 1 in accordance with another embodiment of the present invention. For example, GUI 300 can be optionally presented to a user after having issued an RTC session request. GUI 300 may also be presented as a means for a user to configure the operation of the RTC application selector with respect to that user. Through GUI 300, a user may inform the RTC application selector of how the selection decision should be carried out. That is, the user can select an RTC application selection technique on a per-data type basis. For example, for each different type of file listed in column 305, in column 310 the user can specify the particular way that the RTC application selector should choose the RTC application to be used in an RTC session to be established to share the designated data type.

In illustration, when the data type to be shared in an RTC session is a 1-2-3® file type, in reference to a Lotus® 1-2-3® file, the user may specify that the RTC application selector should select the most suitable RTC application available according to the performance statistics. Lotus® 1-2-3® is a spreadsheet application available from International Business Machines Corporation of Armonk, N.Y. (IBM). IBM, Lotus, and 1-2-3 are trademarks of International Business Machines Corporation in the United States, other countries, or both. For a data type of HTML, the user may specify that the RTC application selector utilize the "SharedEdit" RTC application, which is a collaborative editor. Other examples are shown in columns 305 and 310.

The "early adopter" designation for a particular data type will cause the RTC application selector to present a list of available RTC applications. The list of RTC applications can include newly introduced RTC applications that may have little or no performance statistics, whether objective or subjective. For example, if one were to request that only the "most suitable" tool be used, it is unlikely that the user would be exposed to a newly introduced RTC application as the lack of performance statistics would prevent that newly introduced RTC application from being selected as a "most suitable" RTC application for a given date type.

In section 315 of GUI 300, the user can specify the technique to be used in selecting the RTC application for the selected data type, e.g., in this case "1-2-3." The choices, as shown, can include, but are not limited to, using the most suitable RTC application as determined according to the RTC session request and the available performance statistics, using a particular RTC application designated by the user, or becoming an early adopter, which causes the user to be queried about which RTC application to be used, for example, through presentation of a list of suggested or available RTC applications for a given data type. Selection of button 320 causes the current setting of the controls in section 315 to be applied or used for all data types specified in column 305, rather than specifying the selection technique for each data type individually.

Figure 4:
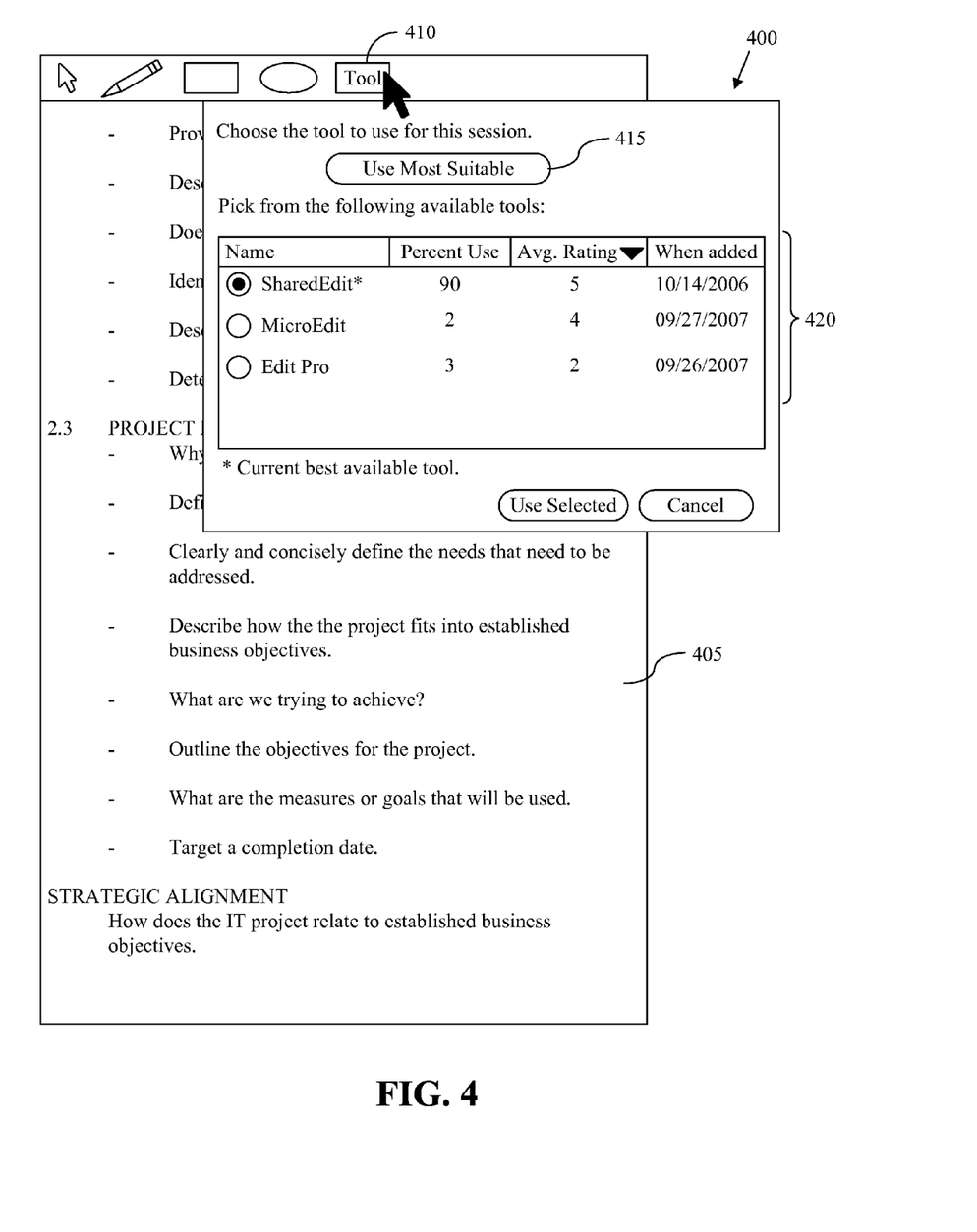
FIG. 4 is a view of a GUI for use with the system of FIG. 1 in accordance with another embodiment of the present invention.

FIG. 4 is a view of a GUI 400 for use with the system of FIG. 1 in accordance with another embodiment of the present invention. The GUI 400 is an example of an interface that can be used for the early adopter option described with reference to FIG. 3. For example, a user may be editing a document 405 within a personal productivity application on a data processing system. The user can manipulate a pointing device to select control 410, which invokes or sends an RTC session request. In this example, the user has chosen to be an early adopter for data types like that of the document 405 being edited.

Accordingly, responsive to the RTC session request, the RTC application selector can cause GUI 400 to be presented. The GUI 400 can include a control 415 that allows the user to select the most suitable RTC application. The user may view other available RTC applications in section 420. In section 420, the user can see that the RTC application "SharedEdit" is utilized more than any other RTC application for the data type to be shared and also has the highest user rating. The other RTC applications "MicroEdit" and "Edit Pro," however, were only recently added and may have a lesser amount of performance statistics available. Such RTC applications would not be selected as the "most suitable." The early adopter option allows a user to view these RTC applications and potentially select one for utilization, thereby allowing the collection of further performance statistics for the selected RTC application.

The GUIs described with reference to FIGS. 2-4 have been presented for purposes of illustration only. Those skilled in the art will appreciate that other GUIs, including other user-activatable controls, graphics, icons, sounds, and types of user feedback can be used without departing from the spirit of the embodiments disclosed herein.

Figure 5:
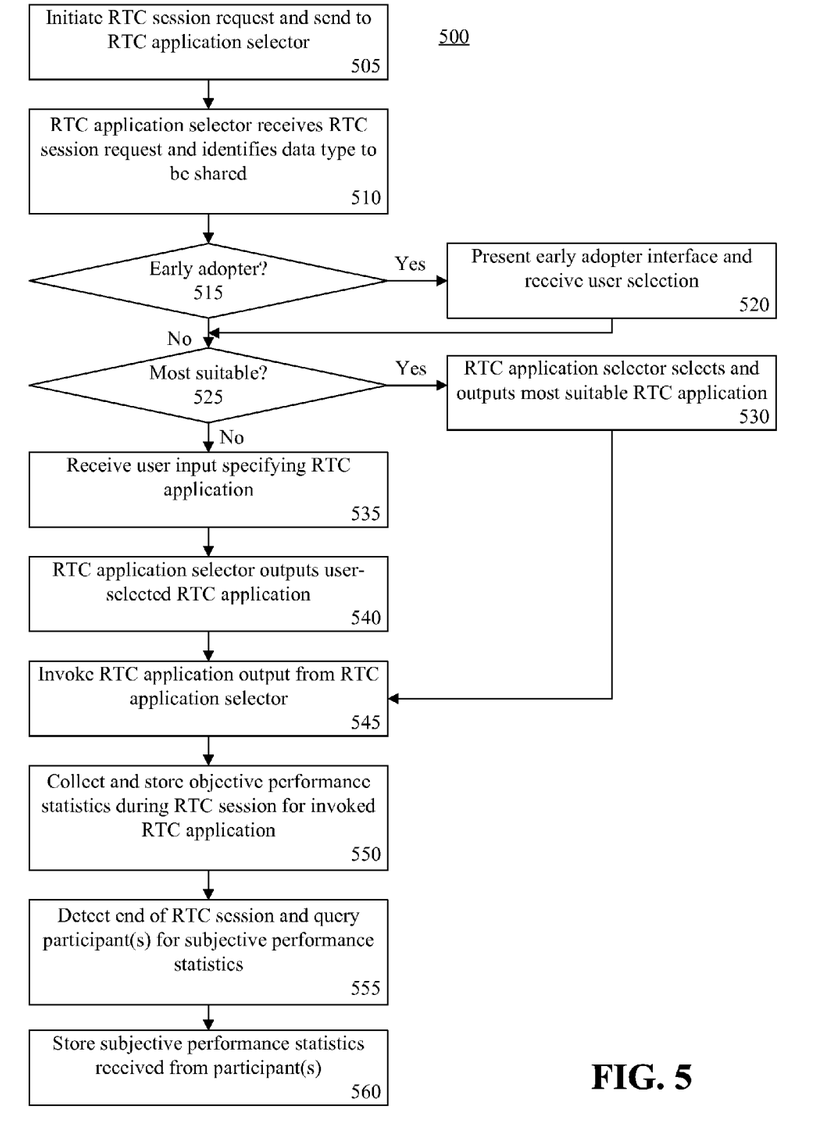
FIG. 5 is a flow chart illustrating a method of selecting an RTC application in accordance with another embodiment of the present invention.

FIG. 5 is a flow chart illustrating a method 500 of selecting an RTC application in accordance with another embodiment of the present invention. The method 500 can be performed by a system as illustrated with respect to FIG. 1, another comparable system, and the various GUIs described herein. The method 500 can begin in a state where performance statistics have been collected for a plurality of different RTC applications.

Accordingly, in step 505, a data processing system executing a personal productivity application can generate an RTC session request that can be forwarded to the RTC application selector. In step 510, the RTC application selector can receive the RTC session request from the requesting data processing system. The RTC application selector further can determine the type of data to be shared in the RTC session, as specified per the RTC session request. As noted, additional information also may be specified by the RTC session request and identified by the RTC application selector. Such information can include, but is not limited to, the number of participants in the RTC session, the identity of one or more or all participants, the geographic location of one or more or all participants, the date and/or time of the RTC session, e.g., the current date and/or time, the identity of the requesting user, or the like.

Beginning in step 515, the RTC application selector can start determining the selection technique to be used in selecting or choosing an RTC application for use in establishing and/or conducting the requested RTC session. Accordingly, in step 515, the RTC application selector can determine whether the user issuing the RTC session request has elected early adopter status for the data type specified by the RTC session request. If so, the method can proceed to step 520. If not, the method can continue to step 525.

In step 520, the RTC application selector can cause an early adopter interface to be presented to the user, e.g., on the display of the requesting data processing system. The early adopter interface can allow the user to provide a user input selecting a particular RTC application or an instruction that the RTC application selector select the most suitable RTC application available according to the data type to be shared in the RTC session, the performance statistics, and optionally other information specified by the RTC session request.

Continuing with step 525, the RTC application selector can determine whether the most suitable RTC application should be selected. If so, the method can proceed to step 530. If not, the method can proceed to step 535. In step 530, the RTC selector application can select the most suitable RTC application from the RTC applications available. As noted, the selection of a particular RTC application can depend upon the performance statistics in combination with various parameters specified in the RTC session request. An evaluation function can be used to score each RTC application in terms of the available information, e.g., performance statistics and information from the RTC session request. The scoring technique may weight one or more parameters more heavily than others, e.g., favor subjective statistics over objective statistics or particular objective statistics over one or more subjective statistics. The RTC application having the highest score, or the top "N" scoring RTC applications, where N can be an integer that is less than or equal to the total number of RTC applications being considered for use for the received RTC session request, may be output. After step 530, the method can proceed to step 545.

When the most suitable RTC application is not to be selected, the method can continue to step 535. In step 535, the user may provide an input to the data processing system, for example, responsive to a query from the RTC application selector. The input can specify the RTC application to be used in establishing and/or conducting the RTC session and can be provide to, and received by, the RTC application selector.

In step 540, the RTC application selector can output the user-selected RTC application. In step 545, the RTC application that is output from the RTC application selector may be invoked or initiated. The RTC application selector can invoke the RTC application. The RTC application can, in turn, establish the requested RTC session among the participants or allow the participants to join. For example, RTC applications can communicate with the RTC application selector via the API of the RTC application selector. The RTC application selector can communicate with the RTC application to be used, invoke the RTC application, and provide the RTC application with any information needed to establish the RTC session. Such information may be programmed within the RTC application selector and/or provided within the RTC session request in accordance with the API provided by the RTC application selector to the personal productivity application.

It should be appreciated that an embodiment where the RTC application selector outputs more than one potential RTC applications, e.g., the most suitable "N" RTC applications, the user working through the requesting data processing system may be presented with a further interface or otherwise be queried to select a particular RTC application from the list of the top "N" RTC applications. In that case, the user selected RTC application can be output and invoked.

Once the RTC application is invoked, the operation of that RTC application may be monitored. In step 550, the RTC application selector can collect and store performance statistics during the RTC session for the invoked RTC application. For example, quantities relating to computer resource usage of the requesting data processing system as well as the data processing system responsible for hosting the RTC application used for the RTC session may be monitored and recorded. The recorded performance metrics may be associated with the RTC application used for the RTC session. For instance, peak values and minimum values of performance statistics may be recorded. Average values may be computed. A record of the changing performance statistics over the course of the RTC session also may be recorded.

In step 555, the RTC application selector can detect the end of the RTC session and query one or more or all of the participants of the RTC session for subjective impressions and information. In step 560, the information received from the participant(s) can be stored as part of the performance statistics for the RTC application used for the RTC session. The performance statistics can be updated as each RTC application is used so that the performance statistics reflect current and accurate data for use in subsequent evaluation of the suitability of RTC applications for use with an RTC session. As the selection techniques are applied to the updated performance statistics, the RTC application selector effectively learns the suitability of RTC applications for a given purpose or data type over time.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of selecting a real time collaboration application comprising:
    associating each of a plurality of real time collaboration applications with a plurality of performance statistics collected from prior real time collaboration sessions involving different ones of the plurality of real time collaboration applications;
    receiving a request for a real time collaboration session from a personal productivity application;
    receiving a user input specifying a data type to be shared during a real time collaboration session using one of the plurality of real time collaboration applications;
    selecting one of the plurality of real time collaboration applications according to the data type to be shared and the plurality of performance statistics; and
    outputting the selected real time collaboration application.

2. The computer-implemented method of claim 1, further comprising defining the performance statistics to comprise objective performance statistics for each of the plurality of real time collaboration applications.

3. The computer-implemented method of claim 2, further comprising selecting the objective performance statistics to comprise a measure of computing resource usage for each of the plurality of real time collaboration applications.

4. The computer-implemented method of claim 2, further comprising selecting the objective performance statistics to comprise an execution environment for each of the plurality of real time collaboration applications.

5. The computer-implemented method of claim 2, further comprising selecting the objective performance statistics to comprise a frame rate for each of the plurality of real time collaboration applications.

6. The computer-implemented method of claim 2, further comprising selecting the objective performance statistics to comprise a measure of latency for each of the plurality of real time collaboration applications.

7. The computer-implemented method of claim 1, further comprising defining the performance statistics to comprise a subjective user rating for each of the plurality of real time collaboration applications.

8. The computer-implemented method of claim 1, further comprising automatically executing the selected real time collaboration application.

9. The computer-implemented method of claim 1, further comprising:
    presenting a list of the plurality of real time collaboration applications; and
    receiving a user input specifying the selected one of the real time collaboration applications.

10. The computer-implemented method of claim 1, further comprising specifying the performance statistics according to the data type to be shared.

11. The computer-implemented method of claim 1, further comprising specifying the performance statistics according to personal productivity application.

12. A computer-implemented method of selecting a real time collaboration application comprising:
    presenting a list comprising a plurality of different data types;
    associating each data type with a selection technique to be used in selecting one of a plurality of real time collaboration applications;
    defining the selection technique used to select the selected real time collaboration application to compare each of the plurality of real time collaboration applications according to performance statistics and identify the selected real time collaboration application according to the performance statistics and the data type to be shared;
    receiving a request for a real time collaboration session, wherein the request comprises a data type to be shared;
    selecting a real time collaboration application according to the selection technique associated with the data type specified by the request; and
    initiating execution of the selected real time collaboration application.

13. The computer-implemented method of claim 12, further comprising defining the selection technique used to select the selected real time collaboration application to explicitly enumerate the selected real time collaboration application.

14. A computer program product comprising:
    a computer-usable memory comprising computer-usable program code that selects a real time collaboration application, the computer-usable medium comprising:
    computer-usable program code that associates each of a plurality of real time collaboration applications with a plurality of performance statistics collected from prior real time collaboration sessions involving different ones of the plurality of real time collaboration applications;

computer-usable program code that receives a request for a real time collaboration session from a personal productivity application;

computer-usable program code that receives a user input specifying a data type to be shared during a real time collaboration session using one of the plurality of real time collaboration applications;

computer-usable program code that selects one of the plurality of real time collaboration applications according to the data type to be shared and the plurality of performance statistics; and computer-usable program code that outputs the selected real time collaboration application.

15. The computer program product of claim 14, wherein the computer-usable memory further comprises computer-usable program code that defines the performance statistics to comprise objective performance statistics for each of the plurality of real time collaboration applications.

16. The computer program product of claim 14, wherein the computer-usable memory further comprises computer-usable program code that defines the performance statistics to comprise a subjective user rating for each of the plurality of real time collaboration applications.

17. The computer program product of claim 14, wherein the computer-usable memory further comprises computer-usable program code that automatically executes the selected real time collaboration application.

18. The computer program product of claim 14, wherein the computer-usable memory further comprises:

computer-usable program code that presents a list of the plurality of real time collaboration applications; and computer-usable program code that receives a user input specifying the selected one of the real time collaboration applications.

19. The computer program product of claim 14, wherein the computer-usable memory further comprises computer-usable program code that specifies the performance statistics according to at least one of data type to be shared or personal productivity application.

\* \* \* \* \*